(12) United States Patent
Natanzon et al.

(10) Patent No.: US 10,067,694 B1
(45) Date of Patent: Sep. 4, 2018

(54) REPLICATION ORDERING

(71) Applicant: EMC Corporation, Hopkinton, MA (US)

(72) Inventors: Assaf Natanzon, Tel Aviv (IL); Leehod Baruch, Rishon Leziyon (IL); Jehuda Shemer, Kfar Saba (IL); Saar Cohen, Moshav (IL); Slavik Neymer, Petah Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 14/674,708

(22) Filed: Mar. 31, 2015

(51) Int. Cl.
G06F 12/00 (2006.01)
G06F 3/06 (2006.01)

(52) U.S. Cl.
CPC .......... G06F 3/0619 (2013.01); G06F 3/065 (2013.01); G06F 3/067 (2013.01)

(58) Field of Classification Search
CPC ........ G06F 3/0619; G06F 3/065; G06F 3/067; G06F 3/0605; G06F 3/0641; G06F 3/0689; G06F 3/0665; G06F 11/2071; G06F 11/2064; G06F 11/1076; G06F 11/2069; G06F 17/30088
See application file for complete search history.

(56) References Cited

U.S. PATENT DOCUMENTS

| | | | | |
|---|---|---|---|---|
| 7,178,055 B2* | 2/2007 | Ji | | G06F 11/2064 711/162 |
| 7,421,549 B2* | 9/2008 | Watanabe | ........... | G06F 11/2064 707/999.202 |
| 8,214,612 B1* | 7/2012 | Natanzon | ............ | G06F 11/1612 707/622 |
| 8,271,441 B1* | 9/2012 | Natanzon | ............ | G06F 11/1471 707/634 |
| 8,332,687 B1* | 12/2012 | Natanzon | ............ | G06F 11/1471 709/202 |
| 8,433,869 B1* | 4/2013 | Natanzon | ................ | G06F 3/065 707/634 |
| 8,600,945 B1* | 12/2013 | Natanzon | ................ | G06F 17/00 707/648 |
| 8,745,004 B1* | 6/2014 | Natanzon | .......... | G06F 17/30067 707/634 |
| 2008/0082770 A1* | 4/2008 | Ahal | ................... | G06F 11/1471 711/162 |
| 2008/0243952 A1* | 10/2008 | Webman | ............. | G06F 11/2097 |
| 2009/0300078 A1* | 12/2009 | Boyd | ................ | G06F 17/30575 |
| 2011/0161295 A1* | 6/2011 | Ngo | .................. | G06F 17/30551 707/639 |
| 2012/0151273 A1* | 6/2012 | Ben Or | ............... | G06F 9/45533 714/41 |

OTHER PUBLICATIONS

"Using EMC Recoverpoint Concurrent Local and Remote for Operational and Disaster Recovery" EMC whitepaper, May 2012.*

* cited by examiner

Primary Examiner — David Yi
Assistant Examiner — Francisco A Grullon
(74) Attorney, Agent, or Firm — Krishnendo Gupta; Robert Kevin Perkins

(57) ABSTRACT

A method, system, and program product for intercepting an IO from a host running a virtual machine directed to a virtual machine disk at a splitter, wherein the host is being replicated by data protection appliances, adding ordering information to the IO, sending the IO to the virtual machine disk, determining one data protection appliance of the data protection appliances to replication the IO, and sending the IO to the one of the data protection appliances.

19 Claims, 13 Drawing Sheets

REPLICATION ORDERING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This Application is related to U.S. Patent Application Ser. Nos. 14/674,241 entitled "CONSISTENCY DETERMINATION" and 14/674,265 entitled "ASYNCHRONOUS REPLICATION".

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and program product for intercepting an IO from a host running a virtual machine directed to a virtual machine disk at a splitter, wherein the host is being replicated by data protection appliances, adding ordering information to the IO, sending the IO to the virtual machine disk, determining one data protection appliance of the data protection appliances to replication the IO, and sending the IO to the one of the data protection appliances.

BRIEF DESCRIPTION OF THE DRAWINGS

The present invention will be more fully understood and appreciated from the following detailed description, taken in conjunction with the drawings in which.

DETAILED DESCRIPTION

Figure 1:
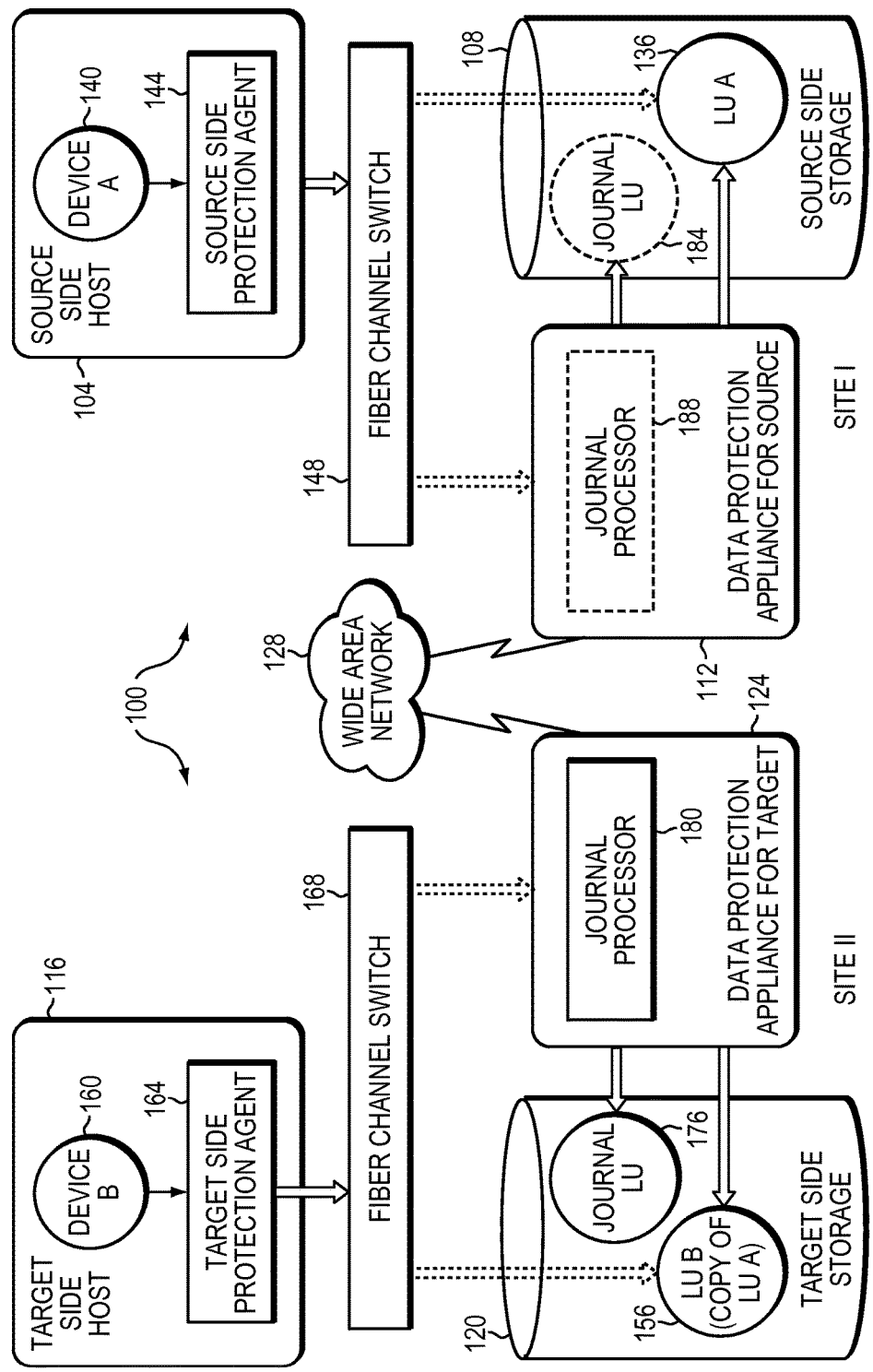
FIG. 1 is a simplified illustration of a data protection system, in accordance with an embodiment of the present disclosure.

In certain embodiments, the current disclosure may enable Distributed Consistency Group (DCG) replication, i.e. running replication of a single consistency group on multiple replication appliances while maintaining consistency and write order fidelity. In some embodiments, the current disclosure may enable asynchronous Distributed Consistency Groups (DCG). In many embodiments, asynchronous distributed consistency groups may be enabled in virtual environments, where virtual machines are replicated and which may significantly reduce the latency of IOs.

In some embodiments, flow of an IO to a DCG in a virtual environment may have several steps. In certain embodiments, a virtual machine (VM) may send an IO to a disk. In most embodiments, an IO sent to a disk may be intercepted by a splitter running on a hypervisor. In many embodiments, the splitter may forward intercepted IO to a virtual replication appliance. In some embodiments, a virtual replication appliance may return an acknowledgement for each IO it receives to a splitter. In certain embodiments, after a splitter receives and acknowledgement for an IO sent to a replication appliance, the splitter may send the IO to storage. In further embodiments, a virtual replication appliance that receives an IO from a splitter may forward the IO to a remote replication appliance. In most embodiments, replication appliance may be assigned to replicate segments of a virtual machine disk and the segments may be denoted by offsets relative to the disk.

In other embodiments, the current disclosure may enable a splitter to send IO to a virtual machine disk without receiving an acknowledgement from a virtual replication appliance. In most embodiments, a splitter may add a transaction counter to each IO that arrives at the splitter. In many embodiments, a splitter may let the original IO continue to the disk. In some embodiments, a splitter may send an IO to the relevant RPA of the distributed CG asynchronously along with a transaction counter. In certain embodiments, a splitter may determine to which RPA an IO should be sent based an offset in the IO. In many embodiments, as each IO from a splitter may have a transaction counter, a replication protection appliance may be able to write IOs to the correct order in a journal based on the ordering of the IO. In many embodiments, a journal with a correct ordering may enable creation of consistent snapshots.

In certain embodiment, a consistency group may contain multiple virtual machines. In some embodiments, if replicated VMs of a distributed consistency group run on several hypervisors, each splitter may maintain a transaction counter and stamp IOs. In most embodiments, with a distributed consistency group with multiple VMs, periodically there may be a quiesce to synchronize the IOs between the splitters. In many embodiments, synchronizing IO between splitters may allow creating producing consistent snapshots. In some embodiments, marking IO at a splitter may enable consistency for the IOs of that splitter. In most embodiments, temporarily quiescing IO across replication with multiple splitters may enable a consistent point of time across the virtual machines split by the multiple splitters.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA. A RPA or DPA may also be referred to herein as a replication appliance or a protection appliance.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more disk, virtual disks or virtual LUNs, which may correspond to one or more Virtual Machines. LUN may be used interchangeably with LU herein.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch, a storage array, a virtual machine, hypervisor, or other portion of an IO pathe, which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor
This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be a data protection appliance (DPA), which also may be referred to herein as a replication protection appliance, running in a VM or a hypervisor.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A discussion of journal based replication may be integrated with a virtual service layer. may be found in U.S. patent application Ser. Nos. 13/077,256, 13/077,262, and 13/077,266, entitled "CONSISTENT REPLICATION IN A GEOGRAPHICALLY DISPERSE ACTIVE ENVIRONMENT," "INVERSE STAR REPLICATION," and "NETWORKED BASED REPLICATION OF DISTRIBUTED VOLUMES," respectively, filed on Dec. 16, 2010 assigned to EMC Corp., which is hereby incorporated by reference.

A discussion of virtual replication may be may be found in U.S. patent application Ser. No. 13/599,492, entitled "MULTI SITE AND MULTI TENANCY," filed on Aug. 30, 2012 assigned to EMC Corp., which is hereby incorporated by reference.

Embodiment of a Replication System

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network, and that DPAs are optional and DPA code may run on the storage array too.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system or on the storage system itself.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal.

Figure 2:
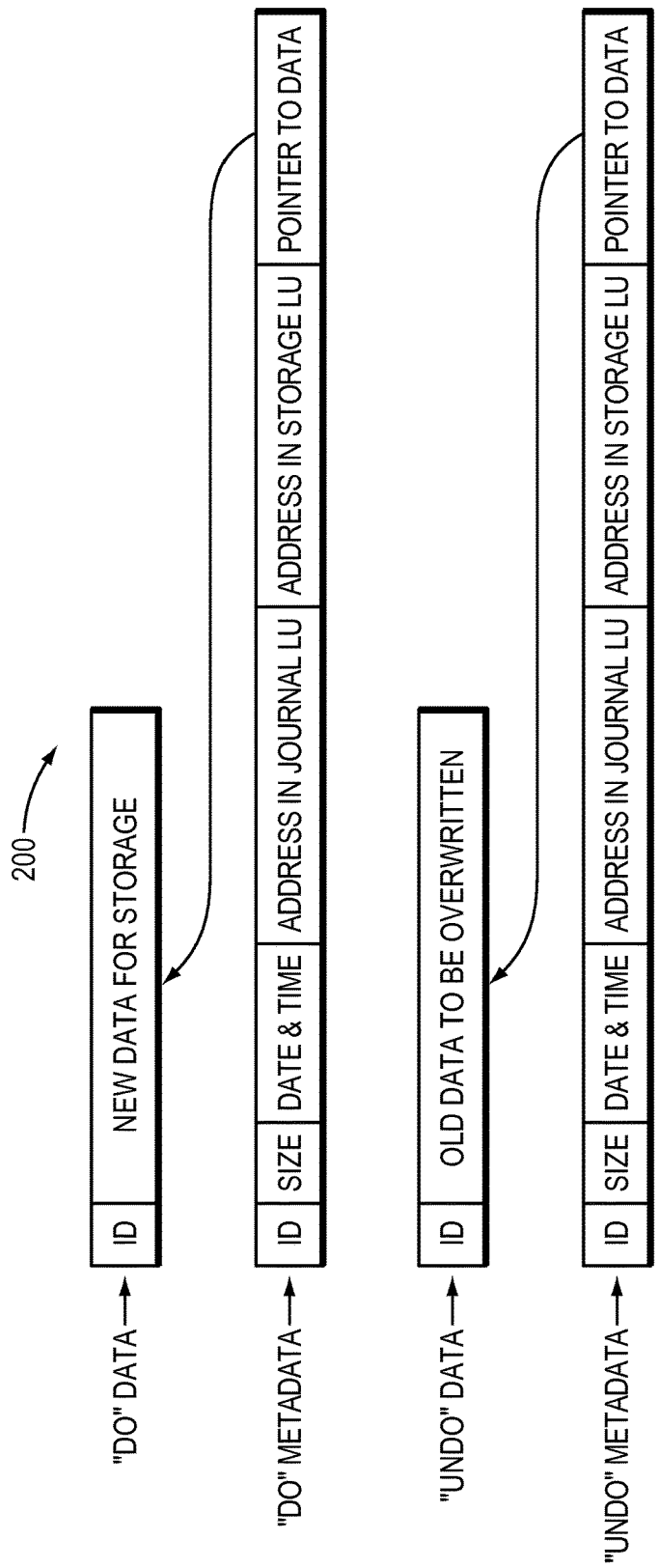
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

Asynchronous Data Replication

Figure 3:
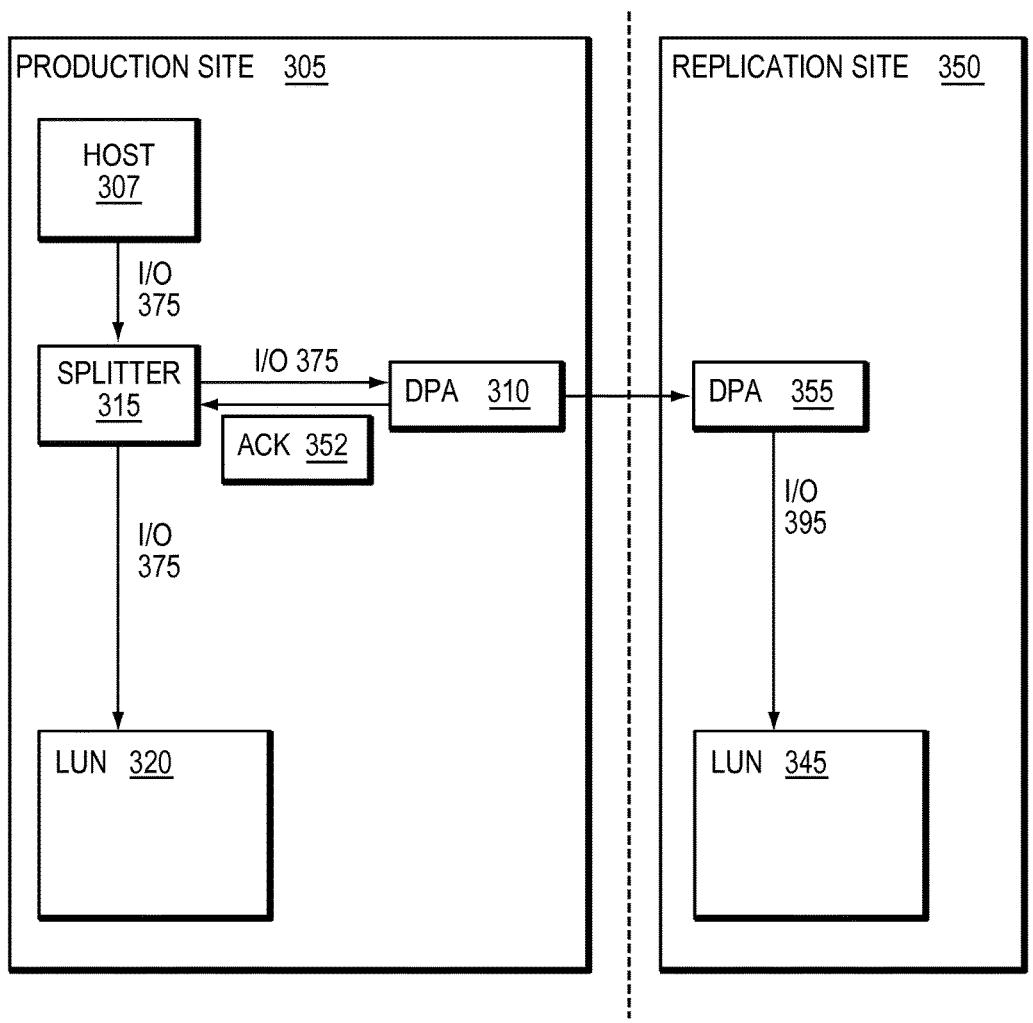
FIG. 3 is an alternative simplified illustration of a data protection system, in accordance with an embodiment of the present disclosure.
Figure 4:
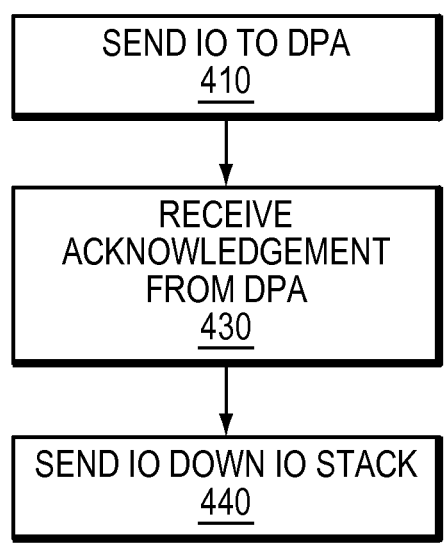
FIG. 4 is a simplified example of a method for data replication, in accordance with an embodiment of the present disclosure.

Refer now to the embodiments of FIGS. 3 and 4. Splitter 315 receives IO 375 from Host 307. Splitter 315 sends IO 375 to DPA 310 (step 410). DPA 310 sends acknowledgement 352 to splitter 315 (step 430). Splitter 315 sends IO 375 to Storage array 360 (step 440).

In further embodiments, when in asynchronous data replication mode, there may be an increased chance of data loss. In some embodiments, data loss may occur as the acknowledgement of receipt of an I/O has been logged, before the I/O may be written to the a DPA. In further embodiments, if there is a crash between the acknowledgement and when the I/O is written, this data may be lost. In some embodiments, asynchronous data replication may be useful when latency does not allow synchronous replication or when some small amount of data loss is allowed.

In alternative embodiments, asynchronous data replication may offer the ability to run the production site with little or no slowing due to data protection requirements. This may be because replication requirements, in terms of data needed to be replicated, may not be constant and may fluctuate. Asynchronous data replication may offer a buffer or lag which may buffer data replication, allowing it to build up during heavy replication periods and allowing it to catch up during lighter replication periods.

Figure 5:
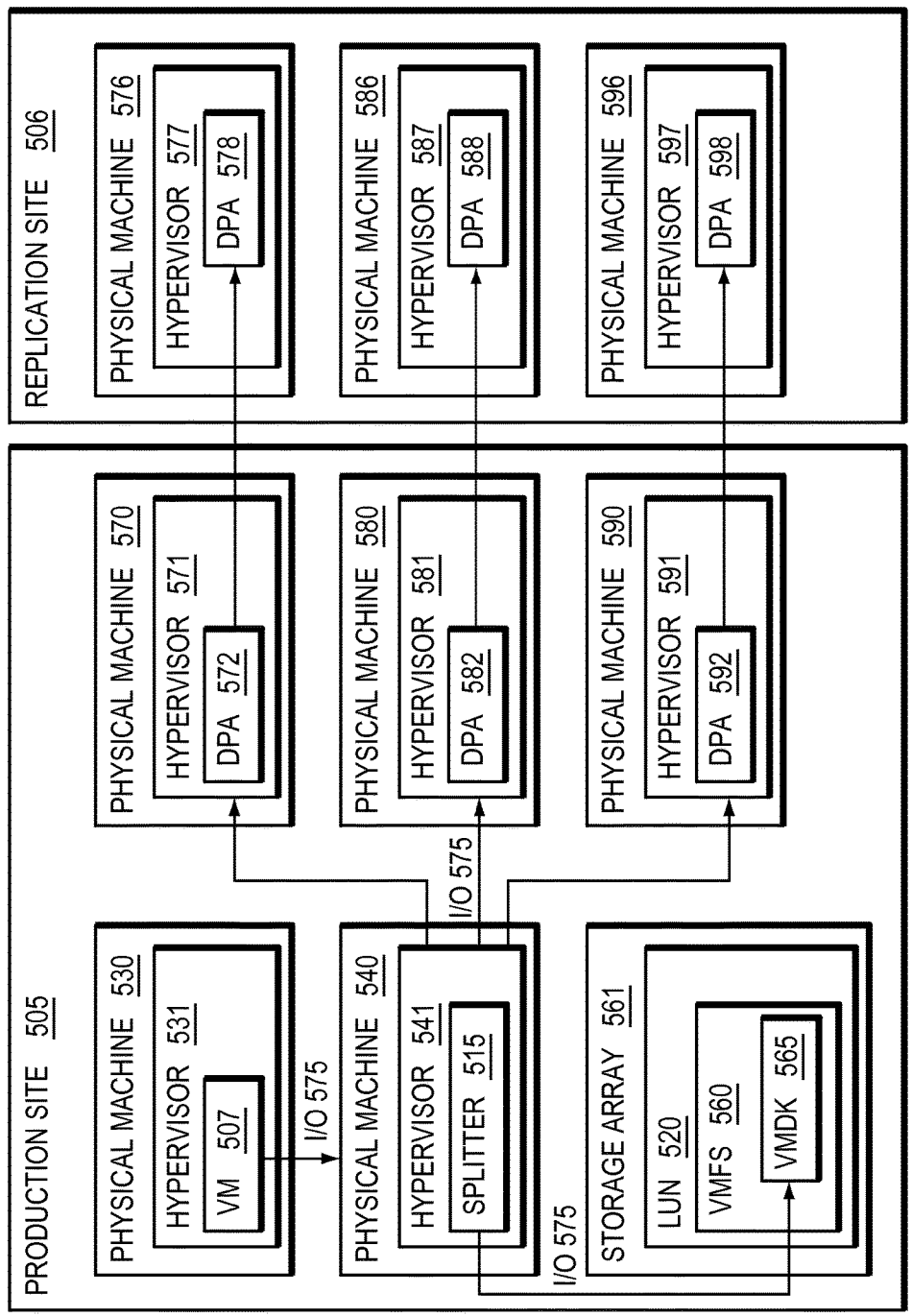
FIG. 5 is a simplified illustration of a data protection system in a virtual environment, in accordance with an embodiment of the present disclosure.
Figure 6:
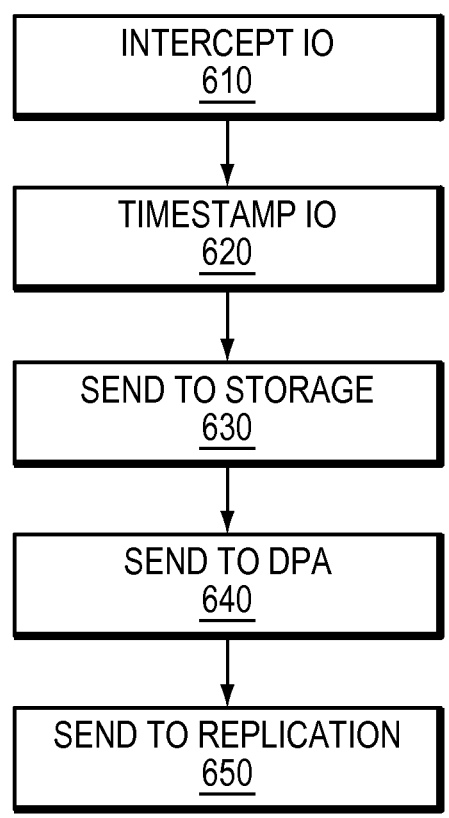
FIG. 6 is a simplified example of a method for data replication without waiting for acknowledgement from a replication appliance, in accordance with an embodiment of the present disclosure.

Refer now to the example embodiments of FIGS. 5 and 6. Physical machine 530 has hypervisor 531, which runs VM 507. VM 507 sends IO 575 to VMDK 565 in VMFS 560 on LUN 520 on storage array 561. Splitter 515 on hypervisor 541 running on physical machine 540 intercepts IO 575 (step 610). Splitter 515 timestamps IO 515 (step 620). Splitter 515 sends IO 575 to storage array 561 (step 630). Splitter makes a determination based on information in IO 575 whether DPA 572, DPA 582, or DPA 592 should replicate IO 575 and sends IO 575 to the appropriate DPA (step 654). Each respective DPA, DPA 572, DPA 582, or DPA 592 forwards received IO to each respective DPA, DPA 578, DPA 588, or DPA 598 on replication site 506 (step 650).

Figure 7:
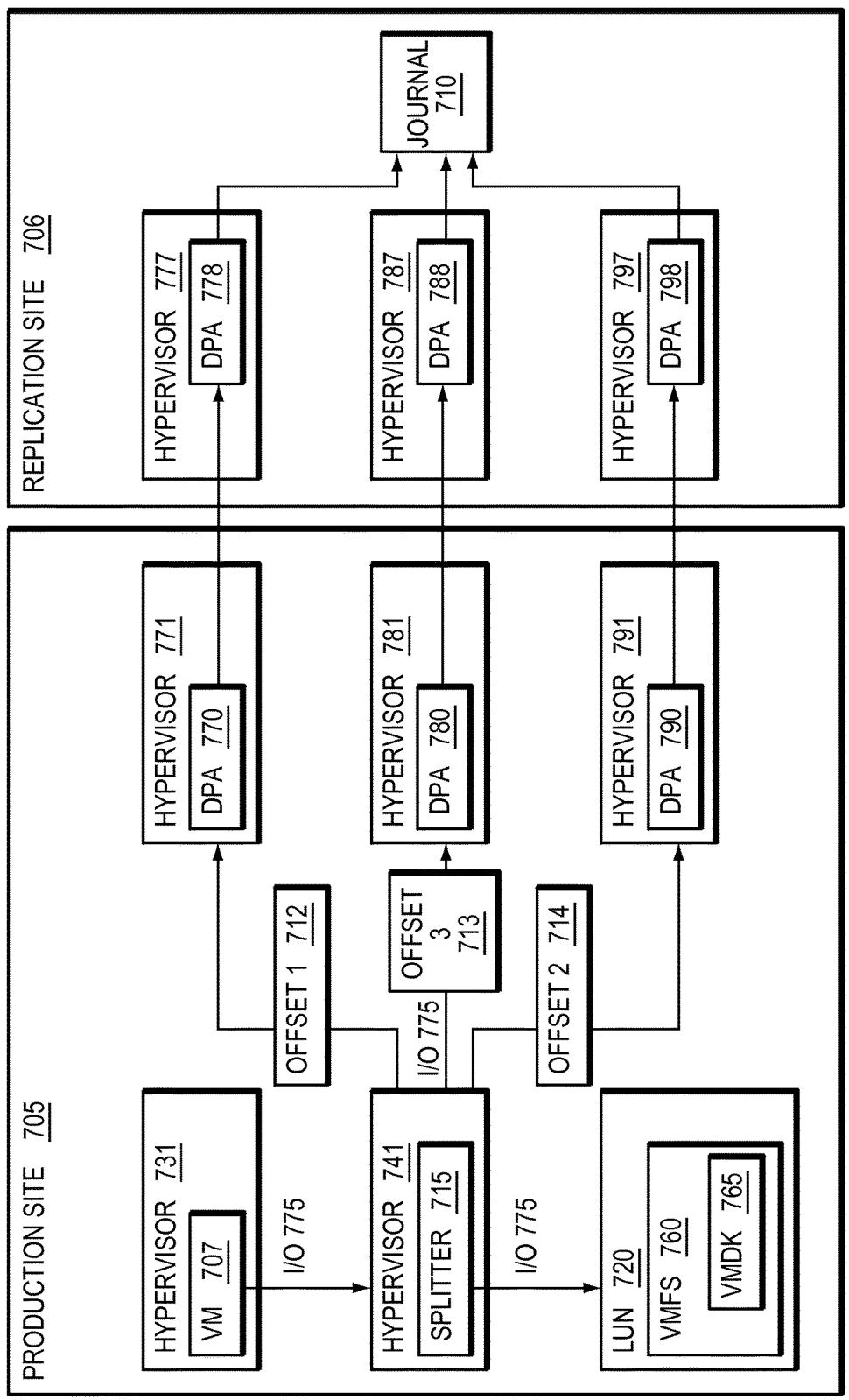
FIG. 7 is an alternative simplified illustration of a data protection system in a virtual environment, in accordance with an embodiment of the present disclosure.
Figure 8:
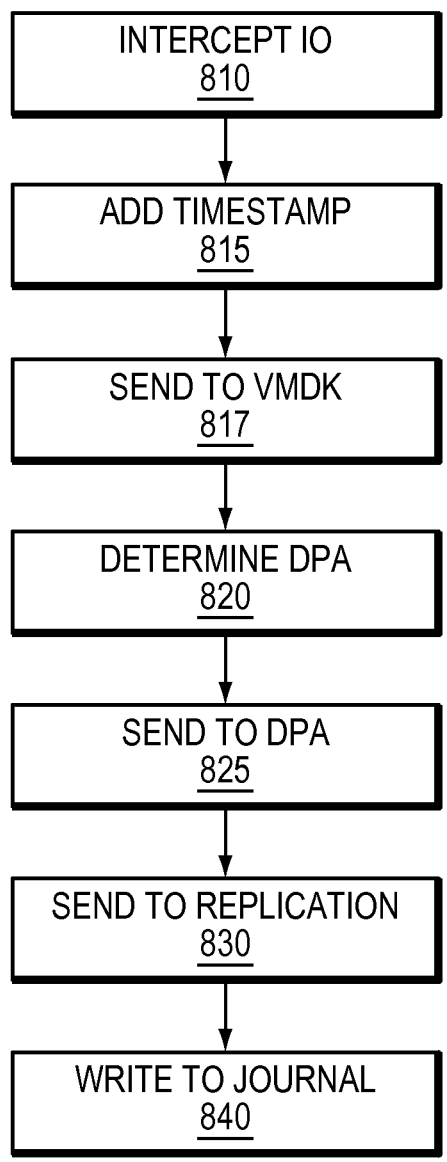
FIG. 8 is an alternative simplified example of a method for data replication without waiting for acknowledgement from a replication appliance, in accordance with an embodiment of the present disclosure.

Refer now to the example embodiments of FIGS. 7 and 8. Hypervisor 731 runs VM 707. VM 707 sends IO 775 to VMDK 765 in VMFS 760 on LUN 720. Splitter 715 on hypervisor 741 intercepts IO 775 (step 810). Splitter 715 timestamps IO 815 (step 815). Splitter 715 sends IO 775 to VMDK 765 (step 817). Splitter 715 sends IO 745 based a determination based on information in IO 775 and offset 1 712, offset 3 713, and offset 2 714 whether DPA 770, DPA 780, or DPA 790 should replicate IO 775 (step 820). DPA 710 sends IO 745 to the appropriate DPA (Step 825). Each DPA, DPA 770, DPA 780, or DPA 790 sends the IO to each respective DPA, DPA 778, DPA 788, or DPA 798, on replication site 706 (step 830). Each DPA, DPA 778, DPA 788, or DPA 798 uses the timestamp information to write IO in order in journal 710 (step 840).

Figure 9:
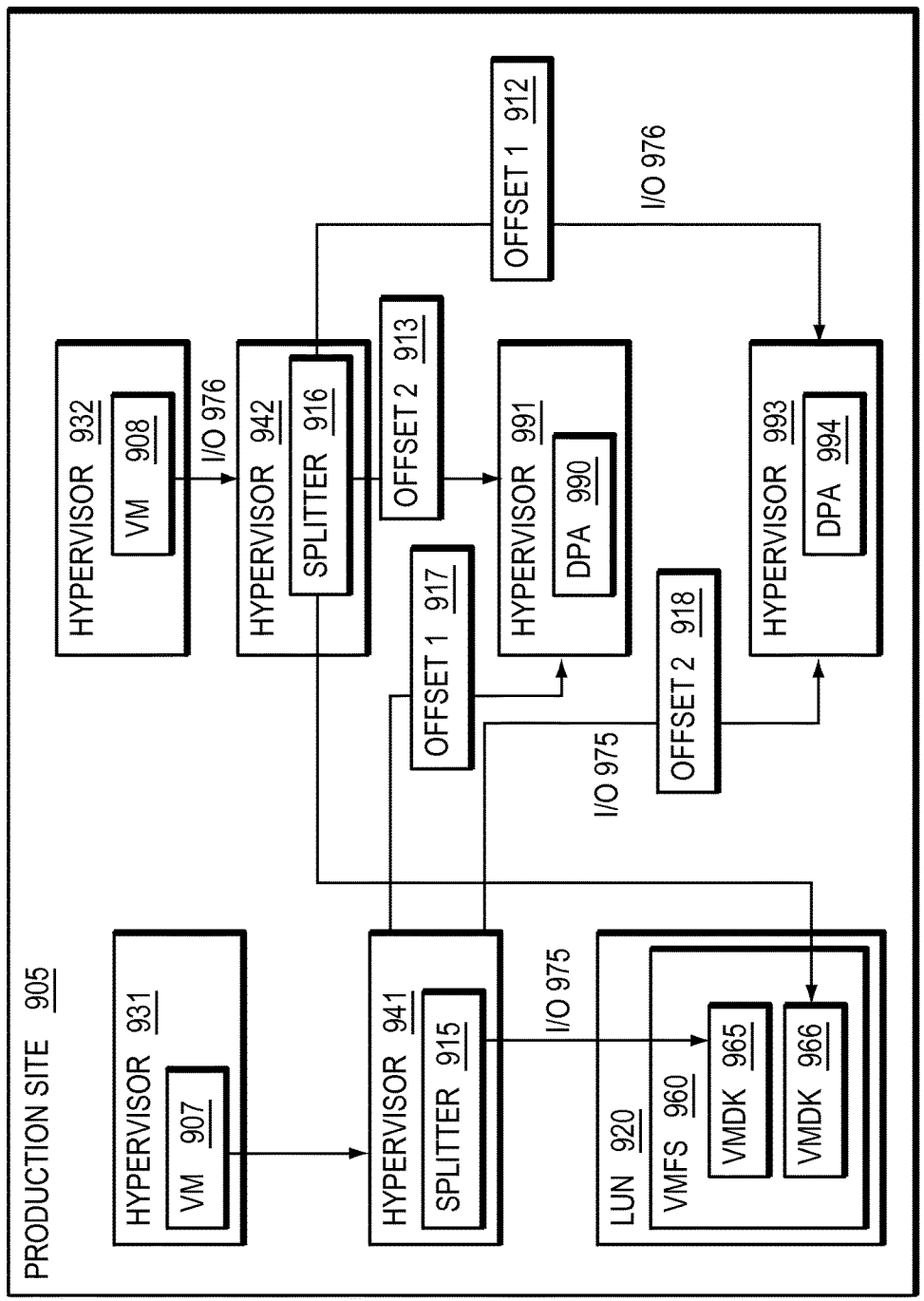
FIG. 9 is a simplified illustration of a data protection system with multiple splitters in a virtual environment, in accordance with an embodiment of the present disclosure.
Figure 10:
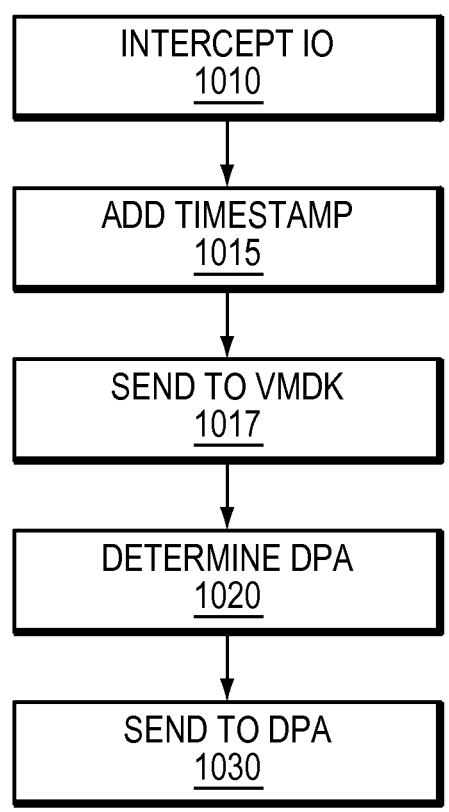
FIG. 10 is a simplified example of a method for replication including adding a timestamp, in accordance with an embodiment of the present disclosure.

Refer now to the example embodiments of FIGS. 9 and 10. VM 907 runs on hypervisor 931. VM 907 sends IO 975 to VMDK 965. Splitter 915 intercepts IO 975 (step 1010). Splitter 915 timestamps IO 975 (step 1015). Splitter 915 sends IO 975 to VMDK 965 (step 1017). Splitter 915 determines whether to send IO 975 to DPA 990 or DPA 994 (step 1020). Splitter 915 sends IO 975, based on offset 2 918, to DPA 994 on hypervisor 993 (step 1030). VM 908 running on hypervisor 932 sends IO 975 to VMDK 966 in VMFS 960. Splitter 916 running on hypervisor 942 intercepts IO 976 (step 1010). Splitter 916 timestamps IO 976 (step 1015). Splitter 916 sends IO 976 to VMDK 966 (step 1017). Splitter 916 determines whether to send IO 976 to DPA 990 or DPA 991 (step 1020). Splitter 916, based on offset 1 912, sends IO 976 to DPA 994 running on hypervisor 93 (step 1030).

Figure 11:
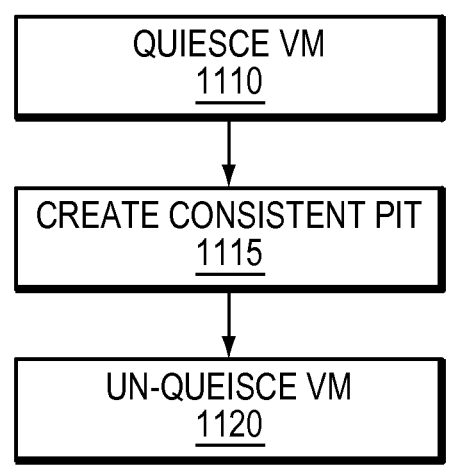
FIG. 11 is an alternative simplified example of creating a consistent point in time across virtual machines, in accordance with an embodiment of the present disclosure.

Refer now as well to FIG. 11, which illustrates taking a consistent point of time across multiple virtual machines in a distributed consistency group. Splitter 915 is quiesced (step 1130), quesing may be done by having the vDPAs stop acknowledging IO commands. Splitter 916 is quiesced (step 1110). A consistent point in time is created (step 1115). Splitter 915 is un-quiesced (step 1120). Splitter 916 is un-quiesced (step 1120). In some embodiments, in order to make sure the quiesce period is not too long the vDPA may unquiese automatically if quescing last more than a predetermined amount of time. In most embodiments, if a vDPA unquieses itself the bookmark created is deleted and failed. In embodiments with multiple virtual machines, write IO from each virtual machine is ordered in the journal by the timestamp. In other embodiments with multiple virtual machines, to create a consistent ordering between the virtual machines, the virtual machines may be quiesced.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Figure 12:
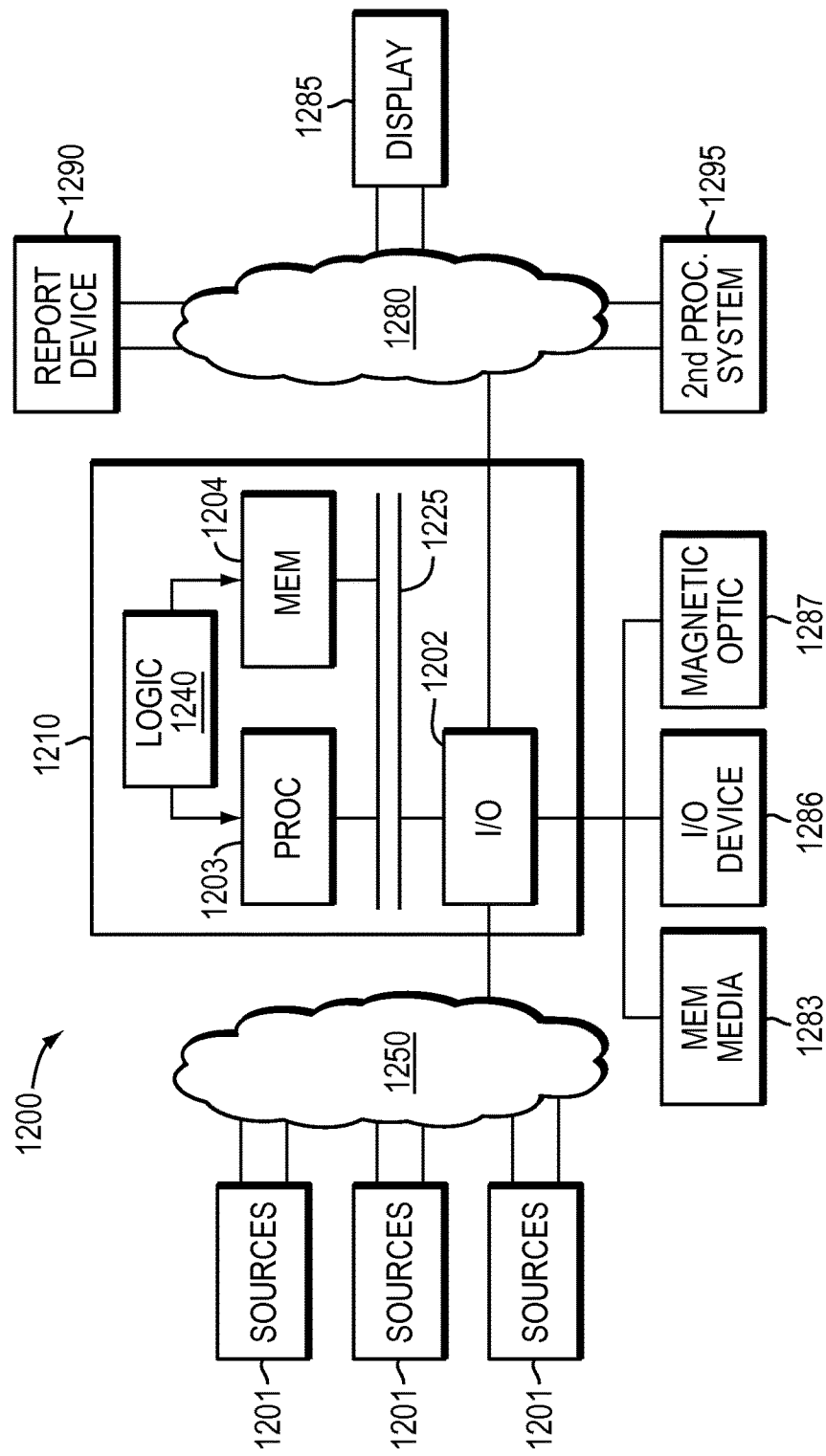
FIG. 12 is an example of an embodiment of an apparatus that may utilize the techniques described herein, in accordance with an embodiment of the present disclosure.
Figure 13:
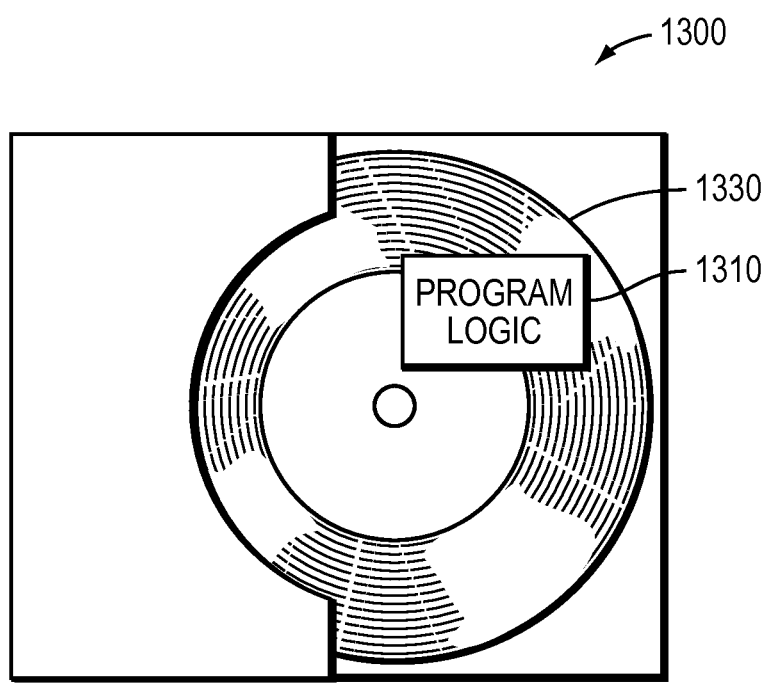
FIG. 13 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor 1203 to provide a unique apparatus that operates analogously to specific logic circuits. As such a general purpose digital machine can be transformed into a special purpose digital machine. FIG. 13 shows Program Logic 1334 embodied on a computer-readable medium 1330 as shown, and wherein the Logic is encoded in computer-executable code configured for carrying out the reservation service process of this invention and thereby forming a Computer Program Product 1200. The logic 1334 may be the same logic 1240 on memory 1204 loaded on processor 1203. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIGS. 4, 6, 8, 10, 11.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A computer implemented method comprising:
   determining a consistent point in time in a replication environment comprising:
      intercepting an Input/Output (IO) from a host running a virtual machine directed to a virtual machine disk at a splitter, wherein I/Os from the host are replicated by a plurality of data protection appliances, each of the plurality of data protection appliances comprising memory and a computer processor and wherein each of the data protection appliances is selectively responsible for replicating IO sent to a discrete portion of the virtual machine disk;

adding a timestamp, using the splitter, to the IO;
sending the IO to the virtual machine disk after adding the timestamp;
selecting one data protection appliance from the plurality of data protection appliances to replicate the IO in response to an offset in the IO wherein the splitter performs the selecting one data protection appliance of the data protection appliances to replicate the IO; and
sending the IO to the selected data protection appliance.

2. The method of claim 1 wherein a second set of data protection appliances on a replication site paired to the plurality of data protection appliances writes the replicated IO to a journal at the replica site; wherein each of the second set of replication appliances orders the IO written to the journal by using the timestamp.

3. The method of claim 1 wherein the determination of the one data protection appliance by the splitter is based on an offset in the IO.

4. The method of claim 3 wherein the offset in the IO is mapped to the discrete portion of the virtual machine disk replicated by each of the data protection appliances.

5. A computer program product comprising:
a non-transitory computer readable medium encoded with computer executable program code for replication of data, the code configured to enable the execution of determining a consistent point in time in a replication environment comprising:
intercepting an Input/Output (IO) from a host running a virtual machine directed to a virtual machine disk at a splitter, wherein I/Os from the host are replicated by a plurality of data protection appliances, each of the plurality of data protection appliances comprising memory and a computer processor;
adding a timestamp, using the splitter, to the IO;
sending the IO to the virtual machine disk after adding the timestamp;
selecting one data protection appliance of from the plurality of data protection appliances to replicate the IO in response to an offset in the IO; and
sending the IO to the selected data protection appliance.

6. The computer program product of claim 5 wherein each of the data protection appliances is responsible for replicating IO sent to a discrete portion of the virtual machine disk; wherein the splitter performs the determination the one data protection of the data protection appliances to replicate the IO.

7. The computer program product of claim 6 wherein a second set of data protection appliances on a replication site paired to the plurality of data protection appliances writes the replicated IO to a journal at the replica site; wherein each of the second set of replication appliances orders the IO written to the journal by using the timestamp.

8. The computer program product of claim 6 wherein the determination of the one data protection appliance by the splitter is based on an offset in the IO.

9. The computer program product of claim 8 wherein the offset in the IO is mapped to the discrete portion of the virtual machine disk replicated by each of the data protection appliances.

10. A system for data replication, the system comprising:
a plurality of data protection appliances each comprising memory and a computer processor; and
hardware logic storing instructions configured for execution of determining a consistent point in time in a replication environment comprising:
intercepting an Input/Output (IO) from a host running a virtual machine directed to a virtual machine disk at a splitter, wherein I/Os from the host are replicated by the plurality of data protection appliances;
adding a timestamp, using the splitter, to the IO;
sending the IO to the virtual machine disk after adding the timestamp;
selecting one data protection appliance of from the plurality of data protection appliances to replicate the IO in response to an offset in the IO; and
sending the IO to the selected data protection appliance.

11. The system of claim 10 wherein each of the data protection appliances is responsible for replicating IO sent to a discrete portion of the virtual machine disk; wherein the splitter performs the determination the one data protection of the data protection appliances to replicate the IO.

12. The system of claim 11 wherein a second set of data protection appliances on a replication site paired to the plurality of data protection appliances writes the replicated IO to a journal at the replica site; wherein each of the second set of replication appliances orders the IO written to the journal by using the timestamp.

13. The system of claim 11 wherein the determination of the one data protection appliance by the splitter is based on an offset in the IO.

14. The system of claim 13 wherein the offset in the IO is mapped to the discrete portion of the virtual machine disk replicated by each of the data protection appliances.

15. The method of claim 1 wherein the ordering information is added to the IO at the splitter; wherein the splitter runs in the hypervisor.

16. The method of claim 1 wherein the data replication appliances are on a production site.

17. The method of claim 1 wherein the ordering information in the IO enables IO split to and replicated by different protection appliances to be assembled in order based on the ordering information.

18. The method of claim 1 further comprising:
receiving a second IO;
adding ordering information to the second IO;
sending the second IO to the virtual machine disk;
determining a second data protection appliance of the data protection appliances to replicate the IO; and
sending the IO to the second of the data protection appliances.

19. The method of claim 1 further comprising:
receiving the IO at a replication appliance on a replication site;
writing the IO in a journal based on the ordering information in the second IO.

* * * * *

UNITED STATES PATENT AND TRADEMARK OFFICE
CERTIFICATE OF CORRECTION

PATENT NO. : 10,067,694 B1
APPLICATION NO. : 14/674708
DATED : September 4, 2018
INVENTOR(S) : Natanzon et al.

Page 1 of 1

It is certified that error appears in the above-identified patent and that said Letters Patent is hereby corrected as shown below:

In the Claims

Column 15, Line 39, delete "appliance of from" and replace with --application from--

Column 16, Line 15, delete "appliance of from" and replace with --application from--

Signed and Sealed this
Fourth Day of June, 2019

Andrei Iancu
*Director of the United States Patent and Trademark Office*